(12) United States Patent
Gong et al.

(10) Patent No.: US 8,332,902 B2
(45) Date of Patent: Dec. 11, 2012

(54) METHOD AND SYSTEM OF PROVIDING SWITCH BROADCAST TELEVISION

(75) Inventors: Jiong Gong, Lafayette, CO (US); David P. Reed, Boulder, CO (US); Judson D. Cary, Denver, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 1372 days.

(21) Appl. No.: 11/959,967

(22) Filed: Dec. 19, 2007

(65) Prior Publication Data

US 2009/0161752 A1     Jun. 25, 2009

(51) Int. Cl.
*H04N 7/173* (2011.01)
(52) U.S. Cl. .............................. 725/116; 725/93; 709/219
(58) Field of Classification Search ............ 725/86–120; 709/217–231
See application file for complete search history.

(56) References Cited

U.S. PATENT DOCUMENTS

| | | | |
|---|---|---|---|
| 5,761,602 A * | 6/1998 | Wagner et al. | 725/34 |
| 6,305,019 B1 * | 10/2001 | Dyer et al. | 725/91 |
| 6,594,826 B1 * | 7/2003 | Rao et al. | 725/95 |
| 6,973,667 B2 * | 12/2005 | Fritsch | 725/88 |
| 7,627,887 B2 * | 12/2009 | Bisher et al. | 725/91 |
| 7,926,079 B2 * | 4/2011 | Lebar | 725/90 |

* cited by examiner

*Primary Examiner* — Annan Shang
(74) *Attorney, Agent, or Firm* — Brooks Kushman P.C.

(57) ABSTRACT

A method and system of providing switched broadcasting of content to a number of consumers. The content may be transmitted in pieces over broadcast and switched transmission tiers. The broadcast tier being characterized by the continuous transmission of content and the switched tier being characterized by on demand or request based transmission of content.

20 Claims, 1 Drawing Sheet

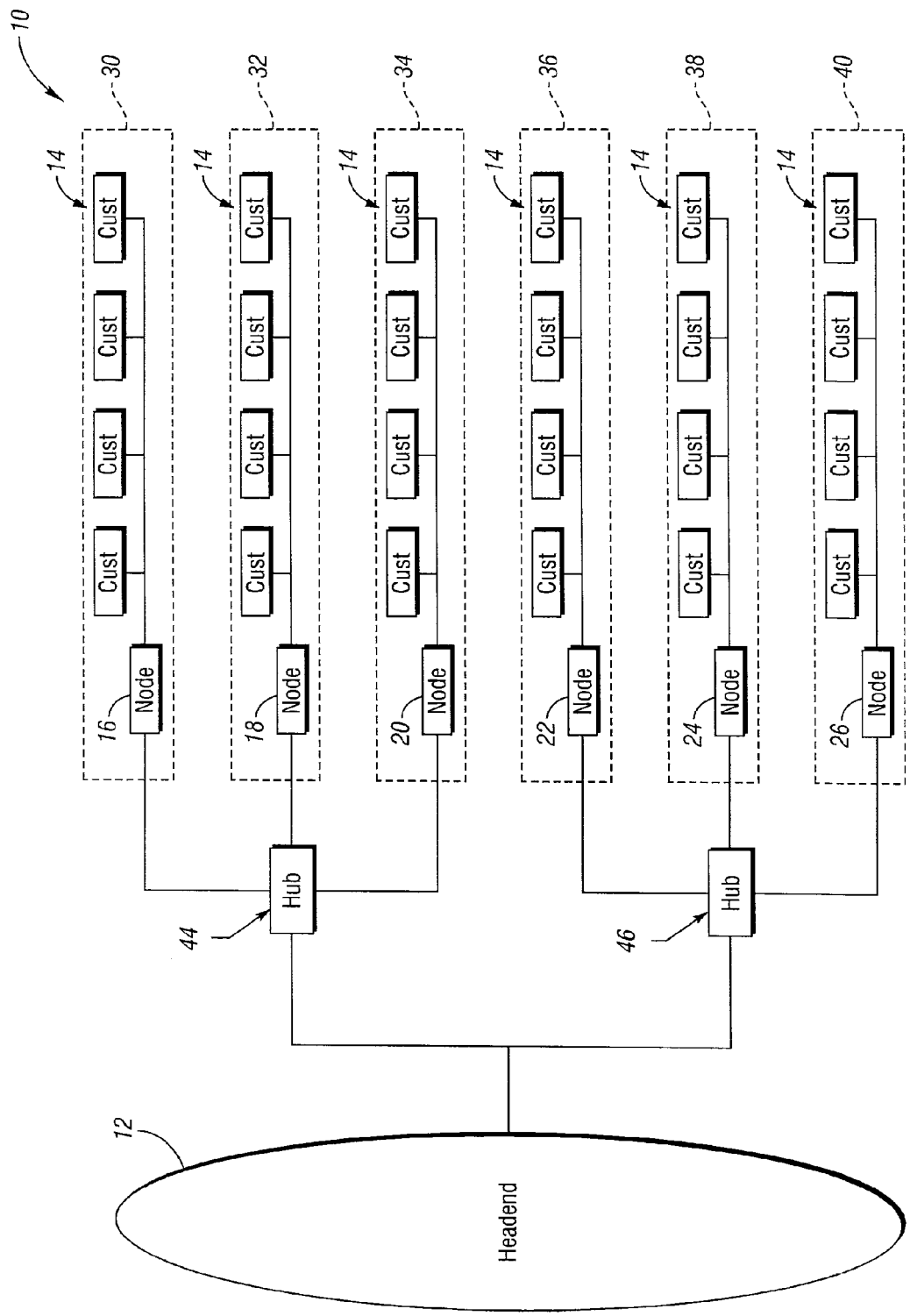

METHOD AND SYSTEM OF PROVIDING SWITCH BROADCAST TELEVISION

BACKGROUND OF THE INVENTION

1. Field of the Invention

The present invention relates to methods and system of providing switched broadcast television (SBT).

2. Background Art

Some cable companies have adopted switched broadcast television (SBT) as a method of plant capacity expansion. SBT differs from traditional broadcasting in that the number of transmitted channels at any one time is usually much less than the actual number of channels available within a particular channel lineup. In order to maximize spectrum savings and the performance benefits of SBT, the channel lineup of a switched tier is typically selected so that the least popular channels represent the long tail of the rating curve while the more popular channels are carried on a broadcast tier.

In a switched digital broadcast architecture, the channels to be switched broadcasted typically are fixed and pre-determined. This can be problematic since channel popularity tends to vary from market to market and at different times of day.

BRIEF DESCRIPTION OF THE DRAWINGS

The present invention is pointed out with particularity in the appended claims. However, other features of the present invention will become more apparent and the present invention will be best understood by referring to the following detailed description in conjunction with the accompany drawings in which:

FIG. 1 illustrates a system for providing switched broadcast television (SBT) in accordance with on non-limiting aspect of the present invention.

DETAILED DESCRIPTION OF THE PREFERRED EMBODIMENT(S)

FIG. 1 illustrates a system 10 for providing switched broadcast television (SBT) in accordance with on non-limiting aspect of the present invention. The system 10 may be configured to transmit a number of television channels from a headend 12 to a number of customers 14 associated with the headend 12. The television channels may be carried over a broadcast tier and switched tier. The broadcast tier may include a number of channels that are continuously transmitted regardless of whether customers 14 are currently requesting the channels. The switched tier may include a number of channels that are only transmitted in response to customers 14 requesting the channels.

A service provider (not shown) associated with providing the SBT services may support or otherwise offer some total number of television channels, which for exemplary purposes may be 100 channels. The transmission of these channels may be partitioned between the broadcast tier and the switched tier. The broadcast tier may support 75 broadcast tiered channels, or some other number of channels, and the switched tier may support the remaining number of channels. In accordance with the broadcast tiered channels being transmitted regardless of customer requests and the switched tiered channels being transmitted only when requested, the 75 broadcast tiered channels are always transmitted while only some number of the switched tiered channels between 0 and up to 25 are transmitted, depending on which one or more of the switched tiered channels the customers are requesting.

The system 10 may include a number of fiber nodes 16, 18, 20, 22, 24, 26 to facilitate transmitting the channels to the customers 14. Each customer 14 associated with the same fiber node 16, 18, 20, 22, 24, 26 may receive the same set of partitioned television channels, i.e., the same set of channels carried over the broadcast tier and the same set of television channels carried over the switched tier. The customers 14 associated with the same node may be collectively referred to as a service group 30, 32, 34, 36, 38, 40. The nodes 16, 18, 20, 22, 24, 26 may provide a fixed spectrum for commonly delivering signals to each of the customers 14 associated therewith. The nodes 16, 18, 20, 22, 24, 26 may be associated with unique addresses to facilitate dedicated communications such that television channels or other messages may be multicasted or otherwise separately communicated to each node 16, 18, 20, 22, 24, 26.

A number of hubs 44, 46 may be included to facilitate relaying the television signals from the headend 12 to each of the nodes 16, 18, 20, 22, 24, 26. The hubs 44, 46 may act as amplifiers or relays to support distribution of the television signals to the nodes 16, 18, 20, 22, 24, 26 associated therewith. The hubs 44, 46 may be associated with unique addresses to facilitate dedicated communications such that television channels or other messages may be multicasted or otherwise separately communicated to each hub 44, 46.

The headend 12 may be configured to transmit the television signals to the hubs 44, 46 for subsequent delivery to the service groups 30, 32, 34, 36, 38, 40. The headend 12 may be configured to selectively partition the available television channels between the broadcast and switched tiers, i.e., to assign 75 of the 100 available channels to the broadcast tier and to assign the remaining 25 channels to the switched tier. The headend 12 may be configured to selectively transmit the television channels to each one of the hubs 44, 46 such that the hubs 44, 46 may receive the same or different partitioning of television channel. This allows the headend 12 to transmit a first set of broadcast and switched tier channels to one of the hubs 44 while transmitting the same or a different set of broadcast and switched tiered channels to the another one of the hubs 46. Optionally, the headend 12 may be configured to transmit the same or different number of broadcast and switched tier channels to each of the hubs 44, 46 such that each hub 44, 46 may have a different number of broadcast channels than the other.

The headend 12 may be configured to transmit the switched tiered channels to the hubs 44, 46 in an on demand fashion when customers associated with service groups assigned to the hub 44, 46 request the television channels. Each one of the switched tiered channels may be transmitted to one or more of the hubs 44, 46 if at least one customer 14 within the one or more associated service groups 30, 32, 34, 36, 38, 40 associated with the hub 44, 46 is requesting the channel. The hubs 44, 46 may be configured to selectively transmit the received switched tiered channels to one or more of its associated service groups 30, 32, 34, 36, 38, 40, depending on which one or more of the service groups includes the customer 14 requesting the channel. This allows each hub 44, 46 to selectively transmit the received switched tier channels such that each service group 30, 32, 34, 36, 38, 40 associated with the hub 44, 46 receives the same or different switched tiered channels.

The channels selected for transmission over the broadcast and switched tiers may be determined as a function of channel popularity. The more popular channels may be carried over the broadcast tiers and the less popular channels may be carried over the switched tiers. The channels selected for one tier may be dynamically/automatically ported between the broadcast and switched tiers depending on market area (service group), historical demand, and other parameters. This can be helpful in allowing the system to maximize the benefits of the switch tier network while allowing it to adjust to the changing demands of the customers.

The most popular channels may be determined according to service group demand. This approach may be distinguished from a customer or other individualistic approach in so far as the popularity may be based on the number the service groups 30, 32, 34, 36, 38, 40 requesting a channel and not the individual number customers 14 requesting the channels. In the present invention, a channel may be provided over the switched tier even though the channel is requested by only one customer 14 in a service group 30, 32, 34, 36, 38, 40. As a result, the distribution of channel preference across service groups 30, 32, 34, 36, 38, 40 matters more in driving the efficiency of switching than the distribution of channel preference among individual viewers.

In a system having five service groups 30, 32, 34, 36, 38, 40 consisting of 500 customers, if there are five customers 14 requesting a channel A at the same time, with each of the customers 14 belonging to a different service group 30, 32, 34, 36, 38, 40, the resulting active customer distribution across the service groups is: 1:1:1:1:1. If there are 500 customers 14 requesting a channel B and all the customers 14 belong to the same service group 30, perhaps due to the unique ethnic background of the subscribers in that service group, the resulting active customer distribution across the service groups is: 500:0:0:0:0.

According to individual customer level popularity theory, channel A is a better candidate for transmission over the switched tier relative to channel B because channel B is the more popular channel with 500 customers compared to the five customers of channel A. The service group popularity of the present invention, however, would determine channel A to be the more popular channel because it has five service groups 30, 32, 34, 36, 38, 40 requesting viewing as opposed to the single service group 30 requesting viewing of channel B. While this example is rare, representing an extreme case, it highlights a difference between individual level popularity and service group level popularity, underlying the importance of making switching decisions based on the latter. It also points out that there may actually be no need collect the larger quantity of data from each customer required to support the individual level popularity.

For the service group popularity theory of the present invention, if the system consists of n service groups with a total channel lineup of m programs, a channel state function at time t for channel i, i=1, 2, ... m, in service group j, j=1, 2 ... n, may be:

$$s_{i,j}(t) = \begin{cases} 1, & \text{if at least one subscriber in service group } j \text{ is watching channel } i \\ 0, & \text{if no subscriber in service group } j \text{ is watching channel } i \end{cases} \quad (1)$$

The state function of a television channel in a service group may be an on-and-off step function. The service group level popularity for channel i within a time period T may be:

$$S_i(T) = \sum_{j=1}^{n} \int_T s_{i,j}(t) dt \quad (2)$$

Equation (2) measures the total "on time" of program channel i, and sums them over all the service groups, as if describing how often a television channel is being watched by units of service groups as a whole, instead of by the population of all individual customers at large. It may be referred to as a service group level popularity score. With this score calculated, all television channels can be ranked from the highest to the lowest based on $S_i(T)$ as:

$$S_{<1>}(T), S_{<2>}(T), \ldots S_{<1>}(T), \ldots, S_{<n>}(T) \text{ change } n \text{ to } m \quad (3)$$

If there is a target of N program channels to be carried over the broadcast tier, then in accordance with the service group popularity theory of the present invention, the top m-N channels with the highest service group level popularity scores can be carried over the broadcast tier and the rest of the television channels can be carried over the switched tier.

The service group level popularity score in equation (2) may be further modified to account for channel flipping. Channel flipping tends to be sequential over a number of channels before settling down on a specific channel. Including the channel on-time in the popularity score during the flipping stage can over-estimate the overall popularity of a program channel. One can modify (2) by ruling out instances of a customer just flipping through that channel, i.e., the time he spends on that channel is very short, say less than 10 seconds every time. In that case, equation (2) can be changed to:

$$S_i(T) = \sum_{j=1}^{n} \int_T s_{i,j}(t) dt \bigg|_{s_{i,j}(t)=1,\ldots s_{i,j}(t+\alpha)=1, \alpha \geq \nabla} \quad (4)$$

Equation (4) essentially requires that only instances of on-time greater than ∇ seconds will be allowed in the calculation of the service group level popularity score. ∇ can be normally set at 10 seconds or any other suitable length of time.

The cost for supporting particular television channels can be analyzed by comparing the service group popularity determined by the present invention against individual customer based popularity scores determined from common resources, such as but not limited to Nielson ratings. This information can be used to establish a relationship between how often programs are being watched versus the cost of supporting these programs. The weights or the shares of a program channel determined from the service group popularity can be compared with popularity based on individual viewership. The ranking order developed in (3) above scan be compared against the total ranking to calculate the share value of each program:

$$h_i(t) = \frac{S_i(T)}{\sum S_i(T)} \quad (5)$$

Suppose the Neilson rating information gives $N_i(T)$ share for a program channel i, then the relative cost of supporting a program channel can be characterized by the difference between $h_i(T)$ and $N_i(T)$. Let their difference be:

$$C_i(T) = h_i(T) - N_i(T) \qquad (6)$$

Rank order then as:

$$C_{<1>}(T), C_{<2>}(T), \ldots C_{<1>}(T), \ldots, C_{<n>}(T) \text{ -change } n \text{ to } m \qquad (7)$$

Equation (7) ranks the order in a series of values that measure the discrepancy between how often program channels are being watched (Nielsen, percentage of individual watching) and the cost of supporting them in terms of occupying network resources (percentage of service groups requesting). Using this metric, a provider can identify those least watched program channels that are occupying disproportionately more network resources, without ruling out ethnic channels with concentrated regional viewership. This allows the present invention to compare the percentage of service groups 30, 32, 34, 36, 38, 40 requesting a channel to an actual percentage of individuals 14 watching the channel. If a difference between the percentages are low, then the percentage of service groups 30, 32, 34, 36, 38, 40 having the channel are more closely related to the actual percentage of individuals 14 watching the channel such that the cost to support the channel is lower. If the deference is high, the percentage of service groups 30, 32, 34, 36, 38, 40 having the channel are less related to the actual percentage of individuals 14 watching the channel such that the cost to support the channel is higher.

The dynamic updating of switched channels can be non-intrusive and transparent to end viewers 14 so that viewers do not have to see an abrupt disruption of flipping to another frequency band for the same channel or otherwise requiring a transition period when the program channel at issue needs to be simulcast at the same time, both in broadcasting mode and in switched broadcasting mode.

When moving a switched channel to the broadcast tier, assuming the broadcast tier has sufficient bandwidth, the switch channel can be immediately began transmitting on the broadcast tier. The customers 14 currently tuned to the channel on the switched tier can continue to view the channel without interruption such that the channel is now simulcasted over the broadcast and switched tiers. Any future requests for the channel can be directed to the broadcast tier. The channel can be finally removed from the switched tier once the existing streams in the switched tier gradually die out, i.e., after the customers 14 currently tuned to the switched tier channel change to another channel.

When moving a broadcast program channel to the switched tier, all new requests for the channel may be addressed by the switched tier. The customers 14 currently tuned to the channel on the broadcast tier can continue to view the channel without interruption such that the channel is now simulcasted over the broadcast and switched tiers. Any future requests for the channel can be directed to the switched tier. The channel can be finally removed from the broadcast tier once the existing streams in the broadcast tier gradually die out, i.e., after the customers 14 currently tuned to the switched tier channel change to another channel. The customers 14 currently can be regularly polled each service group to make sure there are no active STBs tuning to the broadcast channel.

In one case, the bandwidth capacity for the broadcast tier may be fixed on a one-to-one basis while the bandwidth consumption for the switched tier is statistical in nature with an over-booking ratio, i.e., it makes sense to first vacant the bandwidth capacity in the broadcast tier first by shifting the selected channels to the switched tier first. Once that transition is completed after all the customers 14 tuning to those channels in broadcast tier have all died out, the second phase of shifting selected channels in the switched tier to the broadcast mode can begin. The proposed transition process may require no more extra capacity for the broadcast tier, and may require some extra capacity for the switched tier, but only during the transition period. But this can be addressed if the transition period takes place during an off-peak time, such as in the middle of the night, where the overall implication for extra capacity might be so small and during such a short period of time that it can be effectively ignored.

Program channel profiles may be developed over time to facilitate moving channels between the tiers as a function of changes in channel popularity. The profiles may rely on historic usage patterns to gauge the best times to facilitate channel transitions between the tiers. Since the transition period can avoid peak hours in order to limit bandwidth consumption, updating on a daily or weekly basis may be beneficial. Optionally, the channels partitioned between the tiers may be arranged such that the more popular channels are located next to each other. For the 75 channels of the broadcast tier, for example, the most popular channel may be associated with channel one in a channel lineup, with the second most popular channel being listed as channel two, and so on for each of the channels. This can be helpful when flipping channels in so far as the customer 14 can flip to the next more or less popular channel with each up/down channel change.

The present invention is predominately described with respect to switched broadcast television for exemplary purposes only and without intending to limit the scope and contemplation of the present invention. The present invention is applicable and intended for use in any number of environments, and not just in television systems having a number of televisions channels, such as but not limited to other environments, like data, video, or music streaming, where pieces of content may be carried over broadcast and switched tiers.

One non-limiting aspect of the present invention allows for dynamic selection of switched channels to be automatically implemented within a television system. This may include a framework to automatically determine which channels to switch and a mechanism to update the switched channel lineup in a non-intrusive and transparent manner to the end viewers. This dynamic method of selecting switched channels is based on the notion of service group level popularity, or node level popularity versus the popularity rating information at the individual viewer level. This method does not require massive collection of individual subscriber viewership information.

As required, detailed embodiments of the present invention are disclosed herein; however, it is to be understood that the disclosed embodiments are merely exemplary of the invention that may be embodied in various and alternative forms. The figures are not necessarily to scale, some features may be exaggerated or minimized to show details of particular components. Therefore, specific structural and functional details disclosed herein are not to be interpreted as limiting, but merely as a representative basis for the claims and/or as a representative basis for teaching one skilled in the art to variously employ the present invention.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method of providing switch broadcast television (SBTV), the method comprising:
transmitting a common set of television channels to at least three service groups;
partitioning a more popular portion of the television channels for transmission over a broadcast tier and a less popular portion of the television channels for transmission over a switched tier, wherein the television channel popularity is determined according to a number of service groups requesting each television channel; and
determining a popularity score for each television channel, the popularity scores indicating the number of service groups requesting each channel, comparing the popularity scores to a threshold, and partitioning television channels having popularity scores greater than the threshold to the broadcast tier and television channels having popularity scores less than the threshold to the switched tier.

2. The method of claim 1 further comprising determining the popularity score for each television channel to correspond with a percentage of service groups requesting the television channel relative to a total number of service groups, each service group being comprised of individuals having at least one or more devices operable to tune to the television channels, wherein the devices of each of service groups are operable to tune to the any one of the television channels.

3. The method of claim 2 further comprising determining the service groups to be requesting each television channel only if the television channel is tuned to for a predefined period of time.

4. The method of claim 3 further comprising selecting the predefined period of time to be at least 10 seconds.

5. The method of claim 2 further comprising determining a cost for supporting each television channel based on a comparison of the popularity score of each television channel to an individual popularity score calculated for each television channel, the individual popularity score indicating a percentage of individuals within each service group requesting the television channel relative to a total number of individuals within all of the service groups.

6. The method of claim 1 further comprising, after initially partitioning the television channels to the broadcast and switched tiers, moving a first television channel from the broadcast tier to the switched tier and moving a second television channel from the switched tier to the broadcast tier.

7. The method of claim 6 further comprising moving the first and second channels if the first channel is determined to be less popular than the second channel after the initial partitioning of the television channels.

8. The method of claim 6 further comprising supporting the first channel on both of the switched and broadcast tiers until the first channel is no longer tuned to on the broadcast tier.

9. The method of claim 8 further comprising moving the second channel to the broadcast tier after the first channel is no longer supported on the broadcast tier.

10. The method of claim 6 further comprising assessing available bandwidth on the broadcast tier and controlling movement of the first and second channels based on the available bandwidth.

11. The method of claim 6 further comprising moving the second channel to the broadcast tier while the first channel is still supported on the broadcast tier if the broadcast tier has sufficient bandwidth to support the first and second channels and moving the second channel to the broadcast tier after moving the first channel to the switched tier if the broadcast tier has insufficient bandwidth to support the first and second channels.

12. The method of claim 1 further comprising arranging the channels partitioned to one or both of the tiers such that the more popular channels are located next to each other.

13. A method of transmitting content to a number of service groups over broadcast and switched tiers, the method comprising:
partitioning a more popular portion of the content for transmission over the broadcast tier and a less popular portion of the content for transmission over the switched tier, wherein content popularity is determined according to a number of service groups requesting the content, wherein at least one of the more popular portion of the content has a lower individual popularity than at least one of the less popular portion of the content, wherein individual popularity is determined according to a number of individuals requesting the content; and determining the service groups to be requesting content only if at least one of customers within service group tunes to the content for a predefined period of time.

14. The method of claim 13 further comprising determining a cost for supporting each television channel based on a percentage of service groups requesting the content compared to the individuals requesting the content.

15. The method of claim 13 further comprising, after initially partitioning the content to the broadcast and switched tiers, moving a first piece of content from the broadcast tier to the switched tier.

16. The method of claim 15 further comprising moving the first piece of content if the first piece of content is determined to be less popular than another piece of content transmitted over the switched tier.

17. The method of claim 15 further comprising supporting the first piece of content on both of the switched and broadcast tiers until the first piece of content is no longer tuned to on the broadcast tier.

18. The method of claim 15 further comprising moving the another piece of content to the broadcast tier after the first piece of content is no longer supported on the broadcast tier.

19. The method of claim 15 further comprising moving the another piece of content to the broadcast tier while the first piece of content is still supported on the broadcast tier if the broadcast tier has sufficient bandwidth to support the first and second pieces of content and moving the another piece of content to the broadcast tier after moving the first piece of content to the switched tier if the broadcast tier has insufficient bandwidth to support the first and second pieces of content.

20. A method of providing switch broadcast television (SBTV), the method comprising:
transmitting a plurality of television channels to at least three service groups, a more popular portion of the plurality of television channels being transmitted over a broadcast tier and a less popular portion of the plurality of television channels being transmitted over a switched tier, wherein each service group is comprised of a plurality of customer devices operable to tune to any one of the plurality of television channels over the broadcast tier and the switched tier;
determining a popularity score for each television channel, the popularity scores indicating the number of service groups requesting each channel;
comparing the popularity scores to a threshold; and
partitioning television channels having popularity scores greater than the threshold to the broadcast tier and television channels having popularity scores less than the threshold to the switched tier.

* * * * *